No. 877,174. PATENTED JAN. 21, 1908.
N. CRANE.
FASTENER.
APPLICATION FILED MAR. 27, 1902.
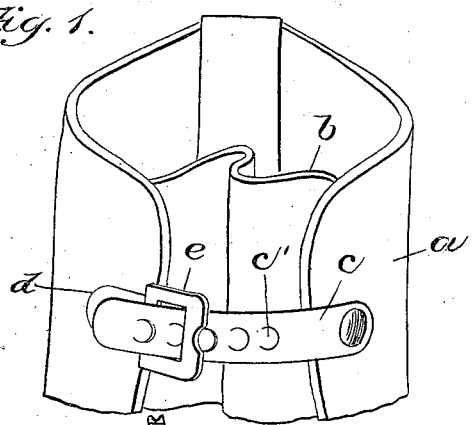
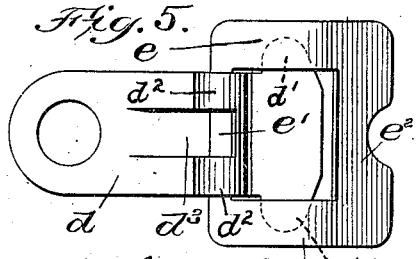
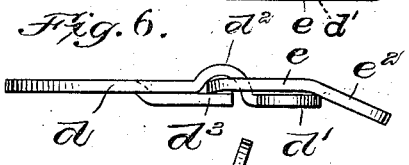
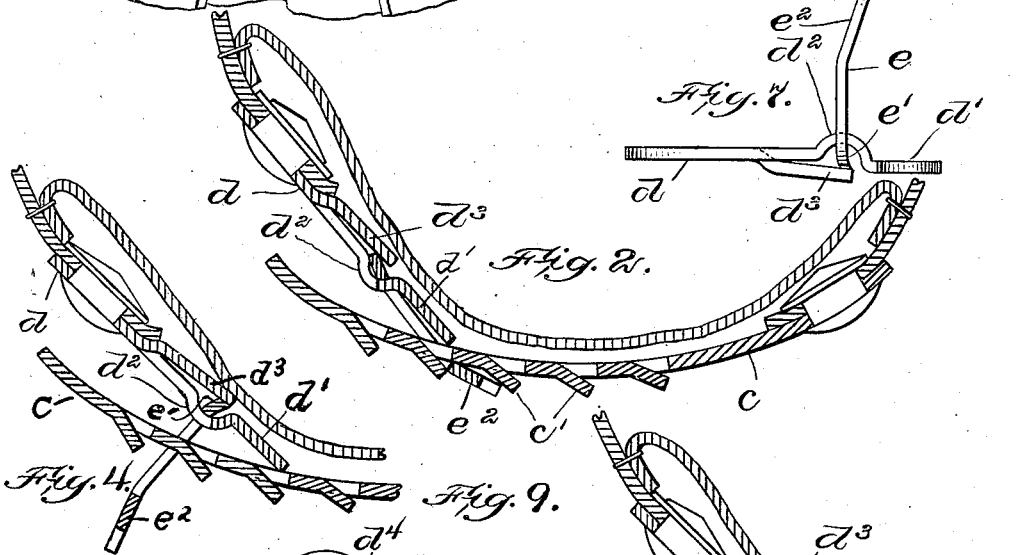
Witnesses:
A. D. Harrim
George Pezzetti
Inventor:
Newton Crane
by Wright Brown Quinby
his Attys

UNITED STATES PATENT OFFICE.

NEWTON CRANE, OF BOSTON, MASSACHUSETTS, ASSIGNOR, BY MESNE ASSIGNMENTS, TO CRANE BUCKLE COMPANY, OF PORTLAND, MAINE, A CORPORATION.

FASTENER.

No. 877,174.　　　　Specification of Letters Patent.　　　　Patented Jan. 21, 1908.

Application filed March 27, 1902. Serial No. 100,197.

*To all whom it may concern:*

Be it known that I, NEWTON CRANE, of Boston, in the county of Suffolk and State of Massachusetts, have invented certain new and useful Improvements in Fasteners, of which the following is a specification.

This invention relates to fasteners of the type applicable for use in securing a shoe, overshoe, or slipper upon the foot, though as will be apparent from the following specification, the invention is not limited in its application to the articles mentioned, but may be used in various ways and for various purposes.

In a previous patent, No. 632,225 granted August 29th, 1899 there is shown a fastener comprising an elongated curved member in the form of a metal strip and fastened to the overshoe near the top at one side of the front opening and provided with a series of catches by striking up portions of the metal; and a coöperating loop member secured to the other side of the front opening so as to permit of the elongated member sliding through it, the outer bar of the loop being adapted to engage any one of the catches and be maintained in engagement therewith by draft upon the two interlocked members, resulting from the shoe top being clasped around the leg. While this device has proven quite efficient, I have found room for improvement therein, and the aim of the present invention is to provide for greater convenience in manipulation of the fastener when adjusting the shoe-top about the leg, and to more securely interlock the parts of the fastener when brought to closed positions. These objects are attained, first, by providing for yieldingly maintaining the loop-member in an outstanding position during preliminary adjustment without requiring it to be manually restrained; and, secondly, by providing for yieldingly holding said loop-member to its closed position when engaged with a catch of the elongated member,—the provisions here involved establishing s apring-pawl-and-ratchet relation between the members,—and for supplying a back-rest for the catch-member so that the latter will be clamped between such back-rest and the front bar of the loop-member, accidental disengagement of the latter from the catch-member being thereby rendered well nigh impossible whatever strains may be imposed upon the fastener.

With the above-stated objects in view, the invention consists in certain novel features of construction and combination of parts, the essential elements of which are recited in the appended claims and preferred forms of embodiment of which are specifically described hereinafter and illustrated in detail in the accompanying drawings, whereof,—

Figure 1 represents in perspective the top part of an overshoe of the arctic type with one form of my improved fastener applied thereto. Fig. 2 represents a central longitudinal section of the same part on an enlarged scale as compared with Fig. 1, the fastener-member being in each instance in locked relation. Fig. 3 is a similar view to Fig. 2, showing a sharper angular relation of loop and catch-member with the parts still interlocked. Fig. 4 is a view similar to Figs. 2 and 3, but illustrating the relation of parts before the members are interlocked. Fig. 5 is a detached plan view of loop-member and adjuncts. Fig. 6 is a side view of the same parts. Fig. 7 is a similar view to Fig. 6, but showing the loop-member in its outstanding position. Fig. 8 is a view similar to Fig. 2, but illustrating a different form of embodiment of the invention. Fig. 9 is a detached plan view of the loop-member and adjuncts of the latter. Fig. 10 is a central longitudinal section of these parts.

Referring first to Figs. 1—7, the reference letter $a$ designates the top of a shoe and $b$ the loose tongue closing the front opening thereof in the usual way. At one side of this opening there is shown, riveted to the material of the top $a$, one end of a metal catch member $c$ having a longitudinal curvature and formed with a series of catches $c'$ produced by striking up portions of the metal. At the opposite side of the said front opening there is anchored in the material of the top (by riveting or otherwise,) a metal supporting member $d$, widened at its outer extremity to form ears $d'$, and transversely offset back of the same to form a hinge-socket $d^2$, the material of the supporting member being cut through on three sides of a rectangle producing a tongue $d^3$ which is bent back so as to protrude from the rear side of the supporting member and extend part way across the aforesaid hinge socket, normally in parallelism with the body of the supporting member as shown in Fig. 6. The loop-member is of generally rectangular form comprising side-bars $e$ and inner and outer end-bars $e'$ and $e^2$ bent at an angle to said side-bars; and this loop-member is interlocked with the supporting-member $d$ by superposing the side-bars $e$ over the ears $d'$ and engaging the end-bars $e'$ with the hinge-socket $d^2$ so that the tongue $d^3$ underlies said end-bar. This can be readily accomplished by thrusting the front end of the supporting member through the loop-member, entering the bar $e'$ thereof (interior edge first) through the opening left between the end of tongue $d^3$ and the opposite side-wall of the socket $d^2$, and then turning the parts into line, the resiliency of the metal of the supporting member $d$, making of the tongue $d^3$ a spring which yields to the pressure of the bar and permits the latter to assume a flattened position in the socket. It will be seen that this spring engaging the underside of the bar $e'$ will tend to hold the loop-member in line with the supporting member and resist the turning outward thereof until it comes to bear flatly against the rear edge of the said bar, when it operates to hold the loop-member in the outstanding position to which the latter will then have been brought, as shown in Fig. 7. This will be the adjustment of the loop-member when the catch-member $c$ is first to be introduced as shown in Fig. 4, said catch-member sliding over the outer end edge of the supporting member $d$ when passed through the loop. Upon turning the latter inwardly, the tongue $d^3$ acts as a spring to snap it against the catch-member and engage the inner edge of the bar $e^2$ with the edge of one of the catches as shown in Fig. 2, said bar being notched so as not to be obstructed by the adjacent catch. It will be seen that under this adjustment of the parts the catch-member is clamped between the loop-bar $e^2$ and the outer edge of the supporting member $d$, so that no amount of distortion of the fastener-members will cause disengagement of the loop and catch members. (See Fig. 3.) Yet such disengagement can be readily effected when intended by prying under the bar $e^3$ with thumb or finger. For the purpose of distinguishing the three members, the catch-member is indicated as a whole at $c$, the loop-member at $e$, and the supporting-member at $d$.

In Figs. 8, 9 and 10, a form of construction is shown adapting the fastener for use with a style of overshoe having looped straps $a'$ secured to the flaps $a^2$ at opposite sides of the front opening. The catch-bar $c^2$ is riveted to an extension strip $c^3$ formed with a slot $c^4$ for the accommodation of one of the straps $a'$; and the back-rest and spring-member for holding the loop-member $e^3$ are formed of a metal strip doubled upon itself, the front part $d^4$ having the hinge-socket, and the back part $d^5$ forming the spring tongue, while both portions are widened at the rear and slotted as at $d^6$ to accommodate the other one of the straps $a'$. This form of fastener performs the same functions as indicated with reference to the form first described, as will be obvious.

It will now be seen that either of the forms of embodiment of the invention herein shown and described is admirably adapted to perfect all of the objects previously stated, but it is nevertheless, to be understood that the invention is susceptible of embodiment in various other forms, and hence in the claims which follow I do not restrict myself to any one species.

Having thus explained the nature of the invention, and described a way of constructing and using the same, although without attempting to set forth all of the forms in which it may be made, or all of the modes of its use, I declare that what I claim is:—

1. A fastener of the character described, the same comprising an elongated catch-member, a loop-member to receive the same and interlock with its catches, and a supporting-member for said loop-member consisting of a strip extending therethrough and widened to underlie the side bars of the loop-member and provide a back-rest for the catch-member, said strip being hingedly connected with the loop-member.

2. A fastener of the character described, the same comprising an elongated catch-member, a loop-member to receive the same and interlock with its catches, and a supporting-member for said loop-member consisting of a strip extending therethrough and widened to underlie the side-bars of the loop-member and provide a back-rest for the catch-member, said strip having a hinge-socket for the inner end bar of the loop-member and a spring-tongue engaging the latter.

In testimony whereof I have affixed my signature, in presence of two witnesses.

NEWTON CRANE.

Witnesses:
MARCUS B. MAY,
GEORGE PEZZETTI.